United States Patent
Noda

Patent Number: 5,844,340
Date of Patent: Dec. 1, 1998

[54] RODLESS CYLINDER DEVICE

[75] Inventor: Mitsuo Noda, Ichinomiya, Japan

[73] Assignee: Howa Machinery, LTD., Nagoya, Japan

[21] Appl. No.: 730,303

[22] Filed: Oct. 11, 1996

[30] Foreign Application Priority Data

Oct. 20, 1995 [JP] Japan .................................. 7-297734

[51] Int. Cl.⁶ .......................... H02K 49/00; F01B 31/10; F01B 29/00
[52] U.S. Cl. .................................. 310/103; 91/46; 92/88; 92/153
[58] Field of Search .......................... 92/153, 88; 91/46; 277/DIG. 7; 310/103, 104, 105

[56] References Cited

U.S. PATENT DOCUMENTS

| | | | |
|---|---|---|---|
| 4,354,125 | 10/1982 | Stoll | 310/103 |
| 4,645,182 | 2/1987 | Stoll | 254/264 |
| 4,674,894 | 6/1987 | Heshmat | 384/406 |
| 5,050,892 | 9/1991 | Kawai et al. | 277/168 |
| 5,279,207 | 1/1994 | Takada et al. | 92/5 R |
| 5,333,535 | 8/1994 | Miyamoto et al. | 92/88 |

FOREIGN PATENT DOCUMENTS

| | | |
|---|---|---|
| 61-116110 | 3/1986 | Japan . |
| 3-14302 | 2/1991 | Japan . |
| 3028508 | 6/1991 | Japan . |
| 2052172 | 1/1981 | United Kingdom . |

OTHER PUBLICATIONS

Patent Abstracts of Japan, vol. 10, No. 304, 16 Oct. 1986.
Patent Abstracts of Japan, vol. 15, No. 155, 6 Feb. 1991.

*Primary Examiner*—Steven L. Stephan
*Assistant Examiner*—Michael J. Wallace, Jr.
*Attorney, Agent, or Firm*—Ladas & Parry

[57] ABSTRACT

In a rodless cylinder device, an inside moving unit is slidably inserted in a cylinder and an outside moving unit is slidably inserted on the cylinder, the inside and outside moving units being magnetically coupled. The inside moving unit has inner sliding guide rings on the two opposite ends with an inside magnet device disposed therebetween. A sealing ring or packing is provided between the inside magnet device and one of the inner sliding guide rings in such a manner that a grease retaining space is formed between the packing and the inner sliding guide ring. While the outside moving unit is moved together with the inside moving unit under the magnetic coupling force between the two moving units, the packing is lubricated by grease supplied from the grease retaining space, whereby the lubricating performance of the rodless cylinder is improved.

8 Claims, 4 Drawing Sheets

RODLESS CYLINDER DEVICE

BACKGROUND OF THE INVENTION

1. Field of the Invention

The present invention relates to a rodless cylinder device having an inside moving unit axially movable in a cylinder, and an outside moving unit guided for movement by the outer circumference of the cylinder and magnetically coupled with the inside moving unit.

2. Description of Related Art

A prior art rodless cylinder device of the type to which the present invention pertains disclosed in U.S. Pat. No. 4,354, 125 to Kurt Stoll comprises a cylinder; an inside moving unit (piston) provided with an inside magnetic device; sliding guide rings disposed on the outer side of the axially opposite ends of the inside magnetic device; packings for fluid-tight sealing disposed on the axially outer side of the sliding guide rings, respectively; and an outside moving unit axially movably put on the outer circumference of the cylinder and provided with an outside magnetic device magnetically coupled with the inside magnetic device. The inside moving unit is moved by an oil or a liquid working medium, such as a mixture of water and an oil, supplied into the cylinder, dragging the outside moving unit by magnetic force.

Another prior art rodless cylinder device disclosed in JP-U (Utility Model) No. 3-14302 published Feb. 13, 1991 has a structure similar to that of the rodless cylinder device described above, and is provided with horizontal Y-cup piston packings (sealing rings) having lips opening axially outward at the transversely opposite ends of the inside moving unit, respectively, and sliding guide rings disposed on its axially inner side. This rodless cylinder device uses compressed air as a working medium for moving the inside moving unit.

Since the rodless cylinder device disclosed in the U.S. Patent uses a liquid containing an oil as a working medium, the inner circumference of the cylinder (inner circumference of the cylinder bore), with which the packing of the inside moving unit is in sealing contact and along which the same slide, is lubricated continuously with the oil. Therefore, this rodless cylinder device does not require any particular care for lubrication. When compressed air is used as the working medium like the rodless cylinder device disclosed in JP-U No. 3-14302, emission of compressed air containing lubricating oil from a selector valve for controlling the operation of the rodless cylinder device into the atmosphere must be suppressed to the least possible extent to prevent environmental pollution, and the use of a lubricator for supplying a lubricant to the compressed air must be avoided for cost reduction. Therefore, lubricating grease is sealed beforehand in the cylinder to retain the grease in a space formed between the outer circumference of the back of the outer lip of a piston packing and the inner circumference of the cylinder in order that lubrication from outside is unnecessary and the rodless cylinder device is able to operate unlubricated. However, in the inside moving unit of the rodless cylinder device disclosed in JP-U No. 3-14302, the front portion of the piston packing spreading in the shape of the letter Y in the cylinder bore is unable to hold the grease, and a portion of the lip in sliding contact with the inner circumference of the cylinder bore cannot satisfactorily lubricated with the grease supplied from the back side of the lip. Consequently, there is the possibility that the sealing function of the piston packing cannot be secured for an extended period of operation.

SUMMARY OF THE INVENTION

Accordingly, it is an object of the present invention to provide a rodless cylinder device of the type comprising a cylinder, an inside moving unit slidably fitted in the bore of the cylinder, and an outside moving unit mounted on the cylinder so as to be dragged for movement through magnetic devices by the inside moving unit, capable of improving the mode of lubrication of a packing attached to the inside moving unit to extend the life of the packing and to enable the inside moving unit to move more smoothly.

According to the present invention, a rodless cylinder actuator comprises a cylinder, an inside moving unit axially slidably fitted in the cylinder, an outside moving unit mounted on the cylinder and magnetically coupled with the inside moving unit, a plurality of sliding guide rings combined with the inside moving unit so as to be in sliding contact with the inner circumference of the cylinder, and at least one sealing ring for preventing the leakage of working fluid, included in the inside moving unit. The sealing ring is disposed on the axially inner side of the sliding guide rings so as to form a grease retaining space between the sealing ring and the sliding guide ring.

More concretely, for example, the inside moving unit is provided with the sliding guide rings on the axially opposite outer sides of an inside magnetic device, one sealing ring capable of preventing the leakage of the working fluid exerting pressure thereon from the axially opposite sides thereof is disposed between one of the sliding guide ring and the inside magnetic device to form a grease retaining space between the same sealing ring and the sliding guide ring. In another arrangement, a sealing ring capable of preventing the leakage of the working fluid exerting pressure thereon from the axially opposite sides thereof is disposed between the sliding guide ring and the inside magnetic device to form a grease chamber between the back of the sealing ring and the corresponding sliding guide ring.

Preferably, the grease retaining space includes a an annular groove of a V-shaped cross section to facilitate the circulation of the grease through the grease retaining space. A lubricating member capable of absorbing or containing the grease, such as a felt ring, may be placed in the grease retaining space. The grease retaining space may be provided with both the circular groove and the lubricating member to enhance the grease retaining capability of the grease retaining space.

BRIEF DESCRIPTION OF THE DRAWINGS

Preferred embodiments of the present invention will be understood from the following detailed description made with reference to the accompanying drawings, in which.

DESCRIPTION OF THE PREFERRED EMBODIMENTS

Figure 1:
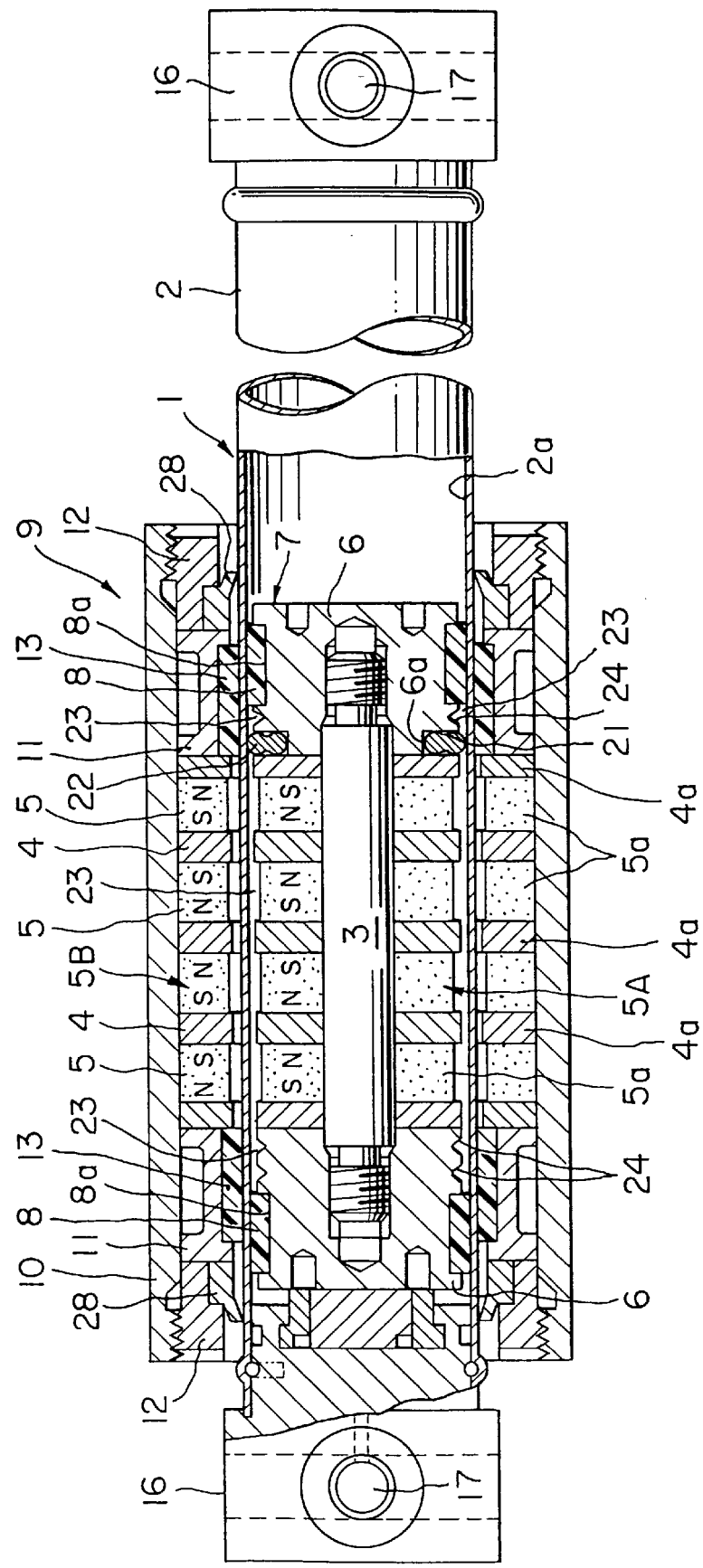
FIG. 1 is a longitudinal sectional view of a rodless cylinder device in a first embodiment according to the present invention.

Referring to FIG. 1 showing a rodless cylinder device 1 in a first embodiment according to the present invention, an inside moving unit 7 is axially slidably fitted in the bore 2a of a cylinder 2 having a thin wall and made of a nonmagnetic material, such as a nonmagnetic stainless steel. The inside moving unit 7 is constructed by mounting an inside magnetic device 5A formed by alternately stacking a plurality of annular yokes 4a made of a magnetic material, such as iron, and a plurality of annular magnets 5a on a piston shaft 3, and screwing a pair of pistons 6 on the opposite ends of the piston shaft 3 so as to compress the inside magnetic device 5A. The annular magnets 5a are axially polarized so that the magnetic poles of the same polarity of the adjacent annular magnets 5a face each other.

Figure 2:
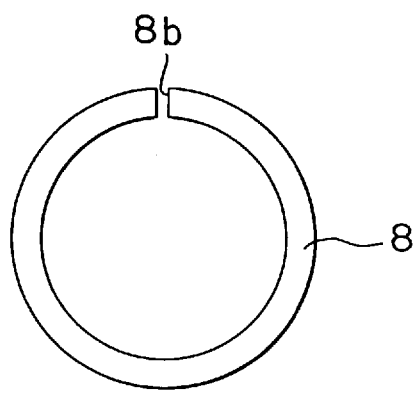
FIG. 2 is a front view of a sliding guide ring employed in the rodless cylinder device of FIG. 1.

Inner sliding guide rings (inner wear rings) 8 are fitted in circular grooves 8a formed in axially outer portions of the pistons 6, respectively. The sliding guide rings 8 are made of a synthetic resin having a coefficient of friction in the range of about 0.1 to about 0.2. Each sliding guide ring 8 is cut at 8b as shown in FIG. 2 to enable the sliding guide ring 8 to be expanded when putting the same in the circular groove 8a. When the inside moving unit 7 is fitted in the bore 2a of the cylinder 2, the outer circumferences of the sliding guide rings 8 are in sliding contact with the inner circumference of the cylinder 2, and a minute clearance is formed between the respective outer circumferences of the magnets 5a and the yoke 4a, and the inner circumference of the cylinder 2 as shown in FIG. 1.

Figure 3:
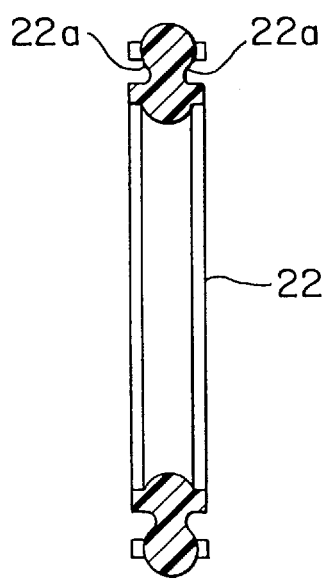
FIG. 3 is a sectional view of a packing employed in the rodless cylinder device of FIG. 1.

The right-hand piston 6 has a reduced portion 6a in its left end portion. When assembling the inside moving unit 7, a packing 22, i.e., a sealing ring, is put on the reduced portion 6a so as to be held in a packing groove 21 defined by the reduced portion 6a and the right end surface of the inside magnetic device 5A. The packing 22 serves as a seal against the pressure of a working fluid that acts axially thereon in opposite directions. As shown in a sectional view in FIG. 3, the packing 22 is provided with annular grooves 22a in its opposite end surfaces, respectively, so that the packing 22 is able to function satisfactorily as a seal against the pressure of a working fluid that acts axially thereon in opposite directions. The packing 22 is of a generally known type. The diameter of the pistons 6 is smaller than the outside diameter of the sliding guide rings 8, and a predetermined clearance is maintained between the outer circumference of each of the pistons 6 and the inner circumference of the cylinder 2 defining the bore 2a.

A very small clearance is secured between the inner circumference of the cylinder 2 and a region of the outer circumference of the right-hand piston 6 located between the sliding guide ring 8 and the packing 22. Therefore, grease contained in a grease retaining space or grease chamber 23 defined by the sliding guide ring 8, the packing 22, the region of the outer circumference of the right-hand piston 6 and the inner circumference of the cylinder 2 is hardly able to leak axially outward beyond the sliding guide ring 8 when the inside moving unit 7 is fitted in the bore 2a. Thus, the grease is sealed in the grease chamber 23. An annular groove 24 of a V-shaped cross section diverging radially outward is formed in the circumference of the piston 6 in the region corresponding to the grease chamber 23. Grease chambers 23 are defined also by the packing 22, the outer circumferences of the magnets 5a and the yokes 4a, and the inner circumference of the cylinder 2, and by the inside magnetic device 5A, the outer circumference of the left-hand piston 6, the sliding guide ring 8 put on the left-hand piston 6 and the inner circumference of the cylinder 2. The left-hand piston 6 is provided in a region of its outer circumference corresponding to the grease chamber 23 with two annular grooves 24 of a V-shaped cross section.

The opposite ends of the cylinder 2 are closed by end caps 16. Each end cap 16 is provided with a working fluid inlet/outlet port 17 through which compressed air is supplied into and discharged from the bore 2a.

An outside moving unit 9 is constructed by inserting an outside magnetic device 5B formed by alternately stacking a plurality of annular yokes 4 of a magnetic material, such as iron, and a plurality of annular magnets 5 in a hollow slider 10 of a nonmagnetic material, such as an aluminum alloy, having an inside diameter greater than the outside diameter of the cylinder 2, inserting sliding guide ring holders 11 on the opposite axially outer sides of the outer magnetic device 5B, and screwing scraper holders 12 in the slider 10 to compress the outside magnetic device 5B and the sliding guide ring holders 11.

Outer sliding guide rings 13 made, similarly to the inner sliding guide rings 8, of a synthetic resin having a small coefficient of friction are held on the sliding guide ring holders 11. The inner circumferences of the outer sliding guide rings 13 come into sliding contact with the outer circumference of the cylinder 2, and the inner circumferences of the magnets 5 and the yokes 4 face the outer circumference of the cylinder 2 with a small clearance therebetween when the outside moving unit 9 is put on the cylinder 2. Scrapers 28 for scraping dust off the outer circumference of the cylinder 2 are held on the inner circumference of the slider 10 on the axially outer sides of the sliding guide ring 13, respectively. The magnets 5 are axially polarized so that the magnetic poles of the same polarity of the adjacent magnets 5 face each other. The axial arrangement of the magnetic poles of the magnets 5 is reverse to that of the magnetic poles of the magnets 5a of the inside magnetic device 5A.

The magnets 5a of the inside magnetic device 5A and the magnets 5 of the outside magnetic device 5B are disposed closely and radially opposite to each other on the opposite sides of the thin wall of the cylinder 2, respectively. Thus, the moving units 7 and 9 are magnetically coupled by the interaction of the magnetic forces of the magnets 5 and 5a. Therefore, the outside moving unit 9 is dragged to move along the outer circumference of the cylinder 2 by the inside moving unit 7 when the inside moving unit 7 moves axially.

When assembling the rodless cylinder device 1, grease is applied over the outer circumference of the inside moving unit 7 to enable the rodless cylinder device to operate unlubricated, the inside moving unit 7 coated with the grease is inserted in the bore 2a of the cylinder 2, the outside moving unit 9 is axially slidably mounted on the cylinder 2, and then the end caps 16 are attached to the opposite ends of the cylinder 2. Compressed air is supplied into and discharged from the cylinder 2 through the working fluid inlet/outlet ports 17 of the end caps 16. Since the leakage of the compressed air is prevented by the packing 22, the inside moving unit 7 is caused to slide with the outer circumferences of the pair of sliding guide rings 8 in sliding contact with the inner circumference of the cylinder 2.

Since the packing 22 is disposed between the right-hand and the left-hand sliding guide rings 8, and the grease chambers 23 are formed on the axially opposite sides of the packing 22, respectively, a portion of the packing 22 in sliding contact with the inner circumference of the cylinder 2 can more satisfactorily be lubricated with the grease contained in the grease chambers 23 than the packing of the foregoing prior art rodless cylinder device having a grease chamber only on the back side of the packing. Consequently, the life of the packing 22 is longer than that of the packing of the prior art rodless cylinder device and the inside moving unit 7 is able to move smoothly.

As the inside moving unit 7 is thus moved, the grease in a radially outer portion of the V-shaped groove 24 is caused to flow toward the bottom of the V-shaped groove along the inclined surface of the V-shaped groove, forcing the grease in a radially inner portion of the V-shaped groove to flow radially outward. Thus, the grease can easily be circulated and thereby the lubricating effect of the grease is enhanced. When the inside moving unit 7 is moved axially, the outside moving unit 9 magnetically coupled with the inside moving unit 7 by the interaction of the magnetic fields created by the inside magnetic device 5A and the outside magnetic device 5B slides axially along the outer circumference of the cylinder 2.

Figure 4:
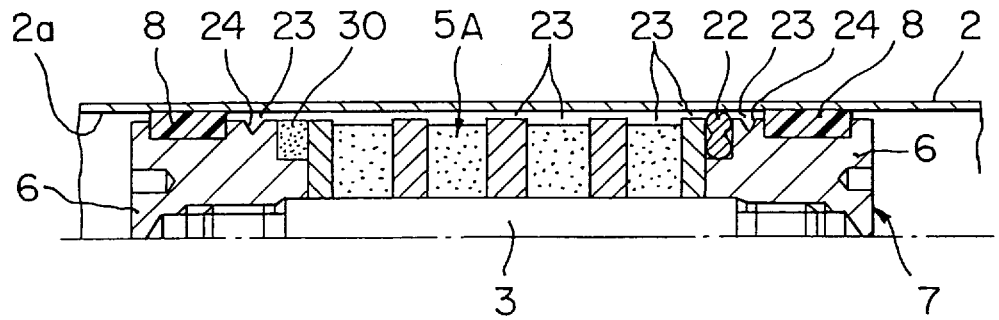
FIG. 4 is a fragmentary half sectional view of a modification of the rodless cylinder device of FIG. 1, provided with a lubricating member.

The left-hand piston 6 may be provided with a lubricating member capable of containing grease, such as a felt ring 30, instead of one of the V-shaped grooves 24 as shown in FIG. 4. In this case, the cooperative grease retaining function of the V-shaped groove 24 and the felt ring 30 further improves lubrication.

Figure 5:
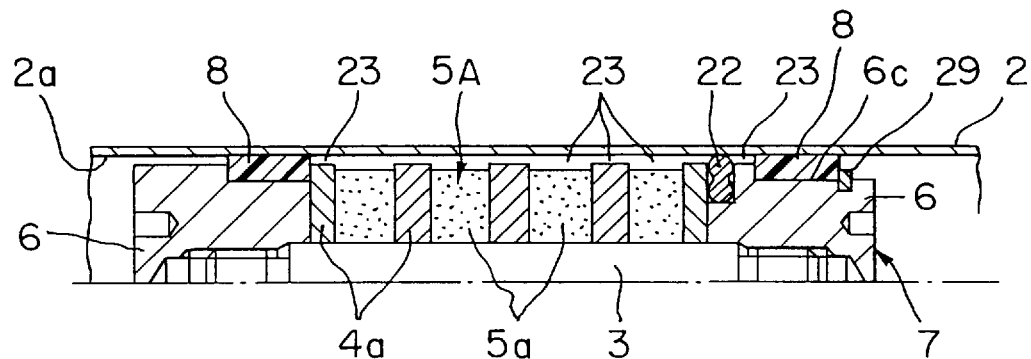
FIG. 5 is a fragmentary half sectional view of a small-diameter rodless cylinder device in accordance with the present invention.

When the present invention is embodied in a small-diameter rodless cylinder device having a cylinder of a relatively small inside diameter of 10 mm or below, the inside moving unit 7 is small and the axial length of the pistons 6 is short. In such a small-diameter rodless cylinder device embodying the present invention as shown in FIG. 5, an inside moving unit 7 is provided with neither V-shaped grooves nor felt rings, and grease chambers 23 are formed in the space between a portion of the outer circumference of a right-hand piston 6 located between a sliding guide ring 8 and a packing 22, and the inner circumference of a cylinder 2, and in the spaces between the outer circumferences of the magnets 5a and the yoke 4a of an inside magnetic device 5A and the corresponding portions of the inner circumference of the cylinder 2. Since the rodless cylinder device shown in FIG. 5 has the grease chambers 23 on the axially opposite sides of the packing 22, the packing 22 can satisfactorily be lubricated. The right-hand sliding guide ring 8 of the embodiment shown in FIG. 5, unlike the sliding guide ring 8 of the first embodiment, is not provided with any cut and has the shape of an entire ring, the sliding guide ring 8 is mounted on a reduced portion 6c of the right-hand piston 6, and the sliding guide ring 8 is restrained from moving off the piston 6 by a snap ring 29.

Figure 6:
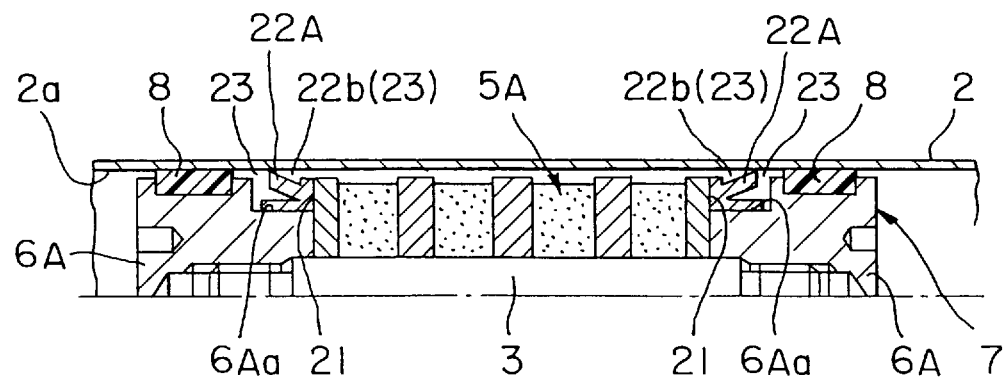
FIG. 6 is a fragmentary half sectional view of a rodless cylinder device provided with a sealing member having a lip of a Y-shaped cross section.

A rodless cylinder device embodying the present invention shown in FIG. 6 employs a Y-cup or U-cup packing 22A. Sliding guide rings 8 are put on an axially outer end portions of a pair of pistons 6A, respectively. The diameter of an axially inner end portions of the pistons 6A is reduced to form reduced portions 6Aa. An inside magnetic device 5A is mounted on a piston shaft 3 and the pistons 6A are screwed on the axially opposite end portions of the piston shaft 3 to form an inside moving unit 7. The packings 22A are placed in packing grooves 21 formed between one of the reduced portions 6Aa and one of the end surfaces of the inside magnetic device 5A and between the other reduced portion 6Aa and the other end surface of the inside magnetic device 5A, respectively.

Each of the packings 22A is provided with a grease containing groove 22b in its back surface. The grease containing grooves 22b form grease chambers 23. A space between the packing 22A and the sliding guide ring 8 put on each of the pair of pistons 6A serves as a grease chamber 23. Thus, the grease chambers 23 are formed on the opposite sides of each of the packings 22A and thereby the packings 22A can satisfactorily be lubricated. In the rodless cylinder device shown in FIG. 6, the piston 6A may be provided with a V-shaped groove in a portion between the packing groove 21 and the sliding guide ring 8, the piston 6A may be provided with a lubricating member capable of containing grease, such as a felt ring, in a portion between the packing groove 21 and the sliding guide ring 8 or the piston 6A may be provided with a V-shaped groove and a lubricating member in a portion between the packing groove 21 and the sliding guide ring 8. Each of the packings 22A may be provided with a groove of a rectangular cross section instead of the V-shaped groove. When the inside moving unit has a relatively long and more than two sliding guide rings, for example, three sliding guide rings, are arranged on the inside moving unit at predetermined intervals, a sealing ring may be disposed between the adjacent sliding guide rings to form grease chambers between the sliding guide rings and the sealing ring.

Figure 7:
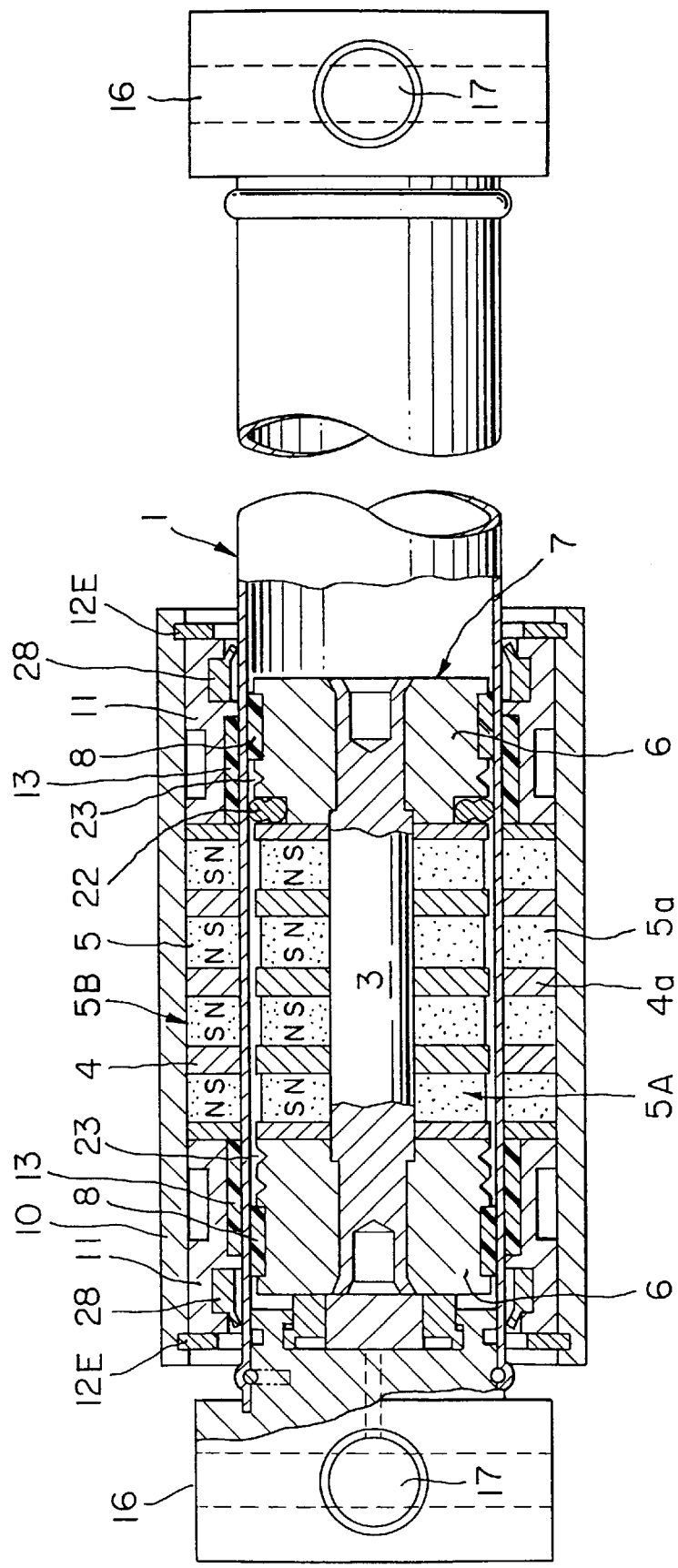
FIG. 7 is a longitudinal sectional view of a rodless cylinder device in a second embodiment according to the present invention.

FIG. 7 shows a rodless cylinder device in a second embodiment according to the present invention. In this rodless cylinder device, pistons 6 are fastened to the opposite ends of a piston shaft 3 by staking instead of screwing the pistons 6 on the piston shaft 3 to fasten the pistons 6 to the axially opposite ends of an inside magnetic device 5A. This method of fastening the pistons 6 to the piston shaft 3 reduces the manufacturing costs. An outside magnetic device 5B and holders 11 fitted in a slider 10 are held in place with snap rings 12E. This method of holding the outside magnetic device 5b an the holders 11 in place simplifies machining processes and facilitate rodless cylinder device assembling work.

A magnetic circuit other than that employed for magnetically coupling the inside moving unit and the outside moving unit in the foregoing embodiments may be used. For example, an outside moving unit not provided with any outside magnetic device and provided with a magnetic slider may be magnetically coupled with an inside moving unit provided with an inside magnetic device, an inside moving unit not provided with any inside magnetic device and provided with a magnetic piston or pistons may be magnetically coupled with an outside moving unit provided with an outside magnetic device, the magnets of the inside and the outside magnetic devices may be polarized radially (in this case, the yokes are made of a nonmagnetic material and the slider of the outside moving unit is made of a magnetic material), or the magnets may be radially polarized and with the outside or the inside moving unit may be not provided with any magnetic device and may comprise components made of magnetic materials. Thus, various modifications of the magnetic circuit are possible.

What is claimed is:

1. A rodless cylinder device comprising:

a cylinder (2) containing a working fluid therein;

an inside moving unit (7) axially slidably fitted in the cylinder and provided on axial end portions thereof with sliding guide rings (8) in sliding contact with an inner surface of the cylinder;

at least one sealing ring (22) provided on the inside moving unit (7) for preventing leakage of the working fluid out of the cylinder;

an outside moving unit (9) axially slidably mounted on an outer surface of the cylinder; and magnetic coupling means (5A, 5B) for magnetically coupling the inside moving unit and the outside moving unit;

wherein said sealing ring (22, 22A) is disposed on an axially inner side of at least one of the sliding guide rings (8) so as to form a grease retaining space (23) between said one sliding guide ring (8) and the sealing ring (22), said grease retaining space (23) including an annular groove (24) formed in an outer surface of said inside moving unit (7), said grease retaining space (23) having a grease filled therein.

2. The rodless cylinder device according to claim 1, wherein said sealing ring is for sealing the working fluid in two opposite axial directions of the cylinder.

3. The rodless cylinder device according to claim 1, wherein said sealing ring is provided for each of the sliding guide rings and is for sealing the working fluid in one axial direction of the cylinder.

4. The rodless cylinder device according to claim 1, wherein said annular groove is of a V-shaped cross section.

5. The rodless cylinder device according to claim 1, wherein said annular groove is formed in a piston of the inside moving unit.

6. The rodless cylinder device according to claim 1, wherein said grease retaining space includes a member having a lubricant absorbing property.

7. The rodless cylinder device according to claim 6, wherein said member is a felt ring.

8. A rodless cylinder device comprising:

a cylinder (2) having an inner surface for containing a working fluid, an outer surface and means for supply and discharge of the working fluid;

an inside moving unit (7) having guide rings (8) on axially opposite end portions of an outer surface of the inside moving unit, whereby the guide rings each have an axially inner side, the guide rings being in sliding contact with the inner surface of the cylinder;

at least one sealing ring (22) on the inside moving unit (7) for preventing leakage of the working fluid out of the cylinder;

an outside moving unit (9) slidable axially on the outer surface of the cylinder; and magnetic coupling means (5A, 5B) for magnetically coupling the inside moving unit and the outside moving unit;

wherein the sealing ring (22, 22A) is on the axially inner side of at least one of the guide rings (8) so as to form a retaining space (23) for grease between the one of the guide rings (8) and the sealing ring (22), and the retaining space (23) includes a V-shaped annular groove (24) in the outer surface of the inside moving unit (7).

* * * * *